(12) United States Patent
Wang et al.

(10) Patent No.: US 7,216,048 B2
(45) Date of Patent: May 8, 2007

(54) CALIBRATED PRESSURE SENSOR

(75) Inventors: Tzu-Yu Wang, Maple Grove, MN (US); Cleopatra Cabuz, Edina, MN (US); Eugen I Cabuz, Edina, MN (US); Stephen R. Shiffer, Pearl City, IL (US); David J. Zook, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/027,289

(22) Filed: Dec. 30, 2004

(65) Prior Publication Data

US 2006/0161364 A1   Jul. 20, 2006

(51) Int. Cl.
*G01L 27/00* (2006.01)
(52) U.S. Cl. ...................................... 702/98
(58) Field of Classification Search ................. 702/52, 702/98
See application file for complete search history.

(56) References Cited

U.S. PATENT DOCUMENTS

| | | | |
|---|---|---|---|
| 3,264,861 A | | 8/1966 | Miles |
| 4,206,761 A | * | 6/1980 | Cosman ............... 600/438 |
| 4,377,851 A | * | 3/1983 | McNamara ............ 702/98 |
| 5,665,899 A | * | 9/1997 | Willcox ............... 73/1.63 |
| 5,693,886 A | * | 12/1997 | Seimiya et al. ........ 73/718 |
| 5,836,750 A | | 11/1998 | Cabuz |
| 6,106,245 A | | 8/2000 | Cabuz |
| 6,179,586 B1 | | 1/2001 | Herb et al. |
| 6,184,607 B1 | | 2/2001 | Cabuz et al. |
| 6,374,191 B1 | * | 4/2002 | Tsuchiya et al. ...... 702/104 |
| 6,432,721 B1 | | 8/2002 | Zook et al. |
| 6,568,286 B1 | | 5/2003 | Cabuz |
| 6,644,117 B1 | | 11/2003 | Kueck et al. |
| 6,649,416 B1 | | 11/2003 | Kauer et al. |
| 6,729,856 B2 | | 5/2004 | Cabuz et al. |
| 6,758,107 B2 | | 7/2004 | Cabuz |
| 6,767,190 B2 | | 7/2004 | Cabuz et al. |
| 2005/0283330 A1 | * | 12/2005 | Laraia et al. ........ 702/104 |

FOREIGN PATENT DOCUMENTS

FR     2123132     9/1972

OTHER PUBLICATIONS

Cho, S. T., et al., "A high-performance microflowmeter with built-in self test", IEEE International Conference on Solid-State Sensors and Actuators, 1991. *Digest of Technical Papers, TRANSDUCERS*, (Jun. 1991),400-403.
Cozma, A. , et al., "Electrostatic actuation as a self-testing method for silicon pressure sensors", *Sensors and Actuators A: Physical*, 60(1-3), (May 1997), 32-36.

* cited by examiner

*Primary Examiner*—John Barlow
*Assistant Examiner*—Jonathan Moffat
(74) *Attorney, Agent, or Firm*—Kris T. Fredrick

(57) ABSTRACT

A control system coupled to a pressure sensor calibrates the pressure sensor. The control system may measure a plurality of capacitance values at a plurality of corresponding applied voltages to compare the values with a first calibration mechanism generated by sample pressure sensors in a comparison. A final calibration mechanism may be generated by adjusting the first calibration mechanism in response to the comparison. The unknown differential pressure may be applied to a diaphragm of the pressure sensor. A capacitance value at the unknown differential pressure may then be measured. Using the final calibration mechanism, the differential pressure at the measured capacitance value may be retrieved.

11 Claims, 4 Drawing Sheets

CALIBRATED PRESSURE SENSOR

RELATED PATENT APPLICATION

This patent application is related to patent application Ser. No. 10/782,356, filed Feb. 19, 2004, entitled: "Capacitive Function Generator."

FIELD

This application relates in general to pressure sensors that include a diaphragm.

BACKGROUND

Some industrial, commercial, aerospace and military systems depend on reliable pressure sensors for fluid (including gas) handling. Pressure sensors are used to measure fluidic pressure in a variety of different areas of discipline. Among recent trends is the increasing use of meso technology. Meso technology uses relatively small devices and an electrostatic force to move diaphragms within the pressure sensors. The electrostatic force is often applied by applying a voltage between two paired electrodes, which are commonly attached to a selected wall and/or a diaphragm. The electrostatic force results in an attractive force between the paired electrodes, which moves the selected wall or diaphragm toward one another.

When pressure sensors are manufactured, they may be trimmed or calibrated in the factory. There is an associated cost with trimming each pressure sensor that, in some cases, may exceed the cost of manufacturing the pressure sensor. However, without first trimming the pressure sensor, the pressure sensor may be inaccurate at a current set of conditions.

Regardless of accurate factory trimming, a diaphragm of the pressure sensor may also be compromised by mechanical stress, aging, and a number of environmental factors such as temperature, humidity, and atmospheric pressure. As a result, the accuracy of the pressure sensor may be compromised in the "field."

BRIEF DESCRIPTION OF THE DRAWINGS

In the figures, like reference characters designate identical or corresponding components and units throughout the several views.

DETAILED DESCRIPTION

Figure 1:
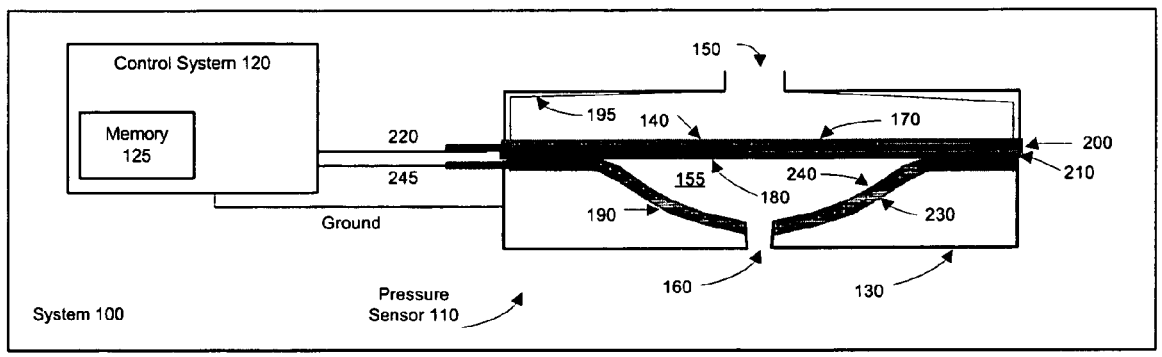
FIG. 1 illustrates a cross-sectional side view of a system including a pressure sensor according to an example embodiment.

FIG. 1 illustrates a cross-sectional side view of a system 100 including a pressure sensor 110 and control system 120 according to an example embodiment. The pressure sensor 110 includes a housing 130, a diaphragm 140, a fluid inlet 150, and a vent 160 or fluid outlet port. The pressure sensor 110 may use the diaphragm 140 to measure the differential pressure in the sensor for an introduced fluid, as described in more detail below.

The housing 130 may be made from any suitable semi-rigid or rigid material, such as plastic, ceramic, silicon, etc. However, the housing body 130 may be constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable plastic material.

The housing 130 includes a first inner wall 190 and a second inner wall 195. For purposes of illustration, the second inner wall 195 is shown to be generally flat. However, the second inner wall 195 may assume other shapes, depending upon the application. For example, the second inner wall 195 may have different regions that are recessed or protrude against the diaphragm 140 in order to, for example, prevent the diaphragm 140 from achieving a suction lock against the second inner wall 195. Other shapes may also be used, including curved shapes, if desired. Although the first inner wall 190 is shown to be conical and curvilinear in cross-section, other shapes may be used, depending on the application.

The diaphragm 140 is contained within the housing in the illustrated embodiment. The diaphragm 140 has a first surface 170 facing the second inner wall 195 and a second surface 180 facing the first inner wall 190 of the housing.

The diaphragm may be of a material, form, or disposed in a fashion such that the diaphragm, once deformed, generates a restoring force that pulls the diaphragm back towards the second inner wall 195. The diaphragm 140 may be made from any suitable material, having elastic, resilient, flexible or other elastomeric property. The diaphragm 140 may be made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material.

With a polymer-based substrate and/or diaphragm, the pressure sensor may be made inexpensively, may be light weight, and/or suitable for small handheld applications, or even suitable for disposable or reusable applications.

The housing 130 includes the fluid inlet 150 along the second inner wall 195, and the vent 160 at a tip of the conical inner wall 190. The vent 160 may be configured for atmospheric pressure, a reference pressure, or a vacuum pressure.

The inner walls 190, 195 of the housing form a fluid chamber 155 fluidically communicating with the fluid inlet 150. The pressure difference in the pressure sensor includes a difference between an inlet pressure at the fluid inlet 150 of the pressure sensor and a reference pressure at the vent 160 of the pressure sensor. The differential pressure within the fluid chamber 155 may change as the pressure of the monitored fluid changes. The diaphragm 140 may proportionally deflect as a result of the change (or differential) in pressure within the fluid chamber 155, as described in more detail below. The fluid in the fluid chamber 155 between the diaphragm and the inner wall 190 may be a dielectric material, such as air. Capacitance may not be sensitive to the dielectric constant of the dielectric material because the capacitance may be dominated by the areas in contact, e.g. dielectric layers 210 and 240. In other embodiments, the fluid in the fluid chamber may not be a dielectric material, and may be a conductive material.

Disposed along the second surface 180 of the diaphragm is a first metal electrode layer 200 that forms a first electrode 220 to extend from the pressure sensor to couple with the control system 120. Disposed along the inner wall 190 is a second metal electrode layer 230 that forms a second stationary electrode 245 to extend from the pressure sensor to couple with the control system 120. The control system 120 may also include a ground. The pressure sensor 110 and the control system 120 may each include wireless connections such that the pressure sensor and the control system may be wirelessly coupled. In an embodiment, the pressure sensor and/or the control system includes an antenna, a coil and/or a plate for frequency and/or electrostatic data transfer. The antenna may be printed or etched, for example, on the first surface 170 or on the second surface 180 of the diaphragm. The antenna may optionally be metallized on the housing 130. The wireless connection of the control system may be attached by soldering, snap-in mechanism, compliant fastener, and/or conductive adhesive.

Disposed along the first metal electrode layer 200 is a first dielectric insulator layer 210. Disposed along the second metal electrode layer 230 is a second dielectric insulator layer 240. A dielectric, such as a low temperature organic and inorganic dielectric, may be used as an insulator between the actuating electrodes 220 and 245. The dielectric may be coated over the electrode 220, electrode 245, or both.

The metal layers 200, 230 may be provided by patterning a conductive coating on the diaphragm 140. For example, electrode 220 may be formed by printing, plating or EB deposition of metal. In some cases, the electrode layer may be patterned using a dry film resist, as is known in the art. The same or similar techniques may be used to provide the electrode 245 on the wall 190 of the housing body 130.

Applying a voltage differential across the electrodes 220, 245 with the control system 120 to apply an electrostatic pressure to the diaphragm 140 may cause the diaphragm to move. The diaphragm may deflect in an activated state toward the stationary electrode via an attractive electrostatic force between the electrodes 200 and 230. The electrostatic force may be of varying strength, but may be sufficient to cause the diaphragm 140 to be deformed toward the wall 190, and in a particular embodiment, so that the diaphragm engages the wall 190. In effect, the applied voltage provides electrostatic pressure; that is, it deforms the diaphragm in a manner similar to but not necessarily identical to the deformation caused by differential pressure. When the voltage is reduced or terminated, the restoring force of the diaphragm 140 may pull the diaphragm back toward the second wall 195 in an un-activated state as shown in FIG. 1. In addition and/or alternatively, applying an actual fluid pressure directly to the diaphragm through the fluid inlet 150 may cause the diaphragm to move.

The diaphragm 140 may contact the inner wall 190 over a larger area for the actual pressure differential than when a same amount of pressure is applied to the diaphragm 140 through the voltage. The diaphragm may be more rounded during actual applied pressure, and may be more flat during voltage applied pressure (or electrostatic pressure). The effective pressure on the diaphragm when a voltage is applied may not be as uniform in comparison to when a true pressure is applied to the diaphragm. Thus the shape of the diaphragm may not be substantially the same in each case, and the first and second calibration curves/algorithms/mechanisms as described herein accordingly may not be the same. However, the first and second calibration curves, algorithms, and/or mechanisms defined herein may be related, as described herein.

The first inner wall 190 and the diaphragm 140 may be configured so that, in the un-activated state, a separation distance between the stationary electrode 245 and the electrode 220 on the diaphragm is smaller near the edges of the chamber 155 as compared with a distance between the electrodes at a center of the chamber. The first inner wall 190 may be curved so that the stationary electrode 245 is located closer to the electrode 220. This may help draw the diaphragm 140 toward the inner wall 190 in a rolling action when the voltage is applied between the electrodes 220 and 245. Such a rolling action may help the pressure sensor efficiency and reduce the voltage used.

Figure 2:
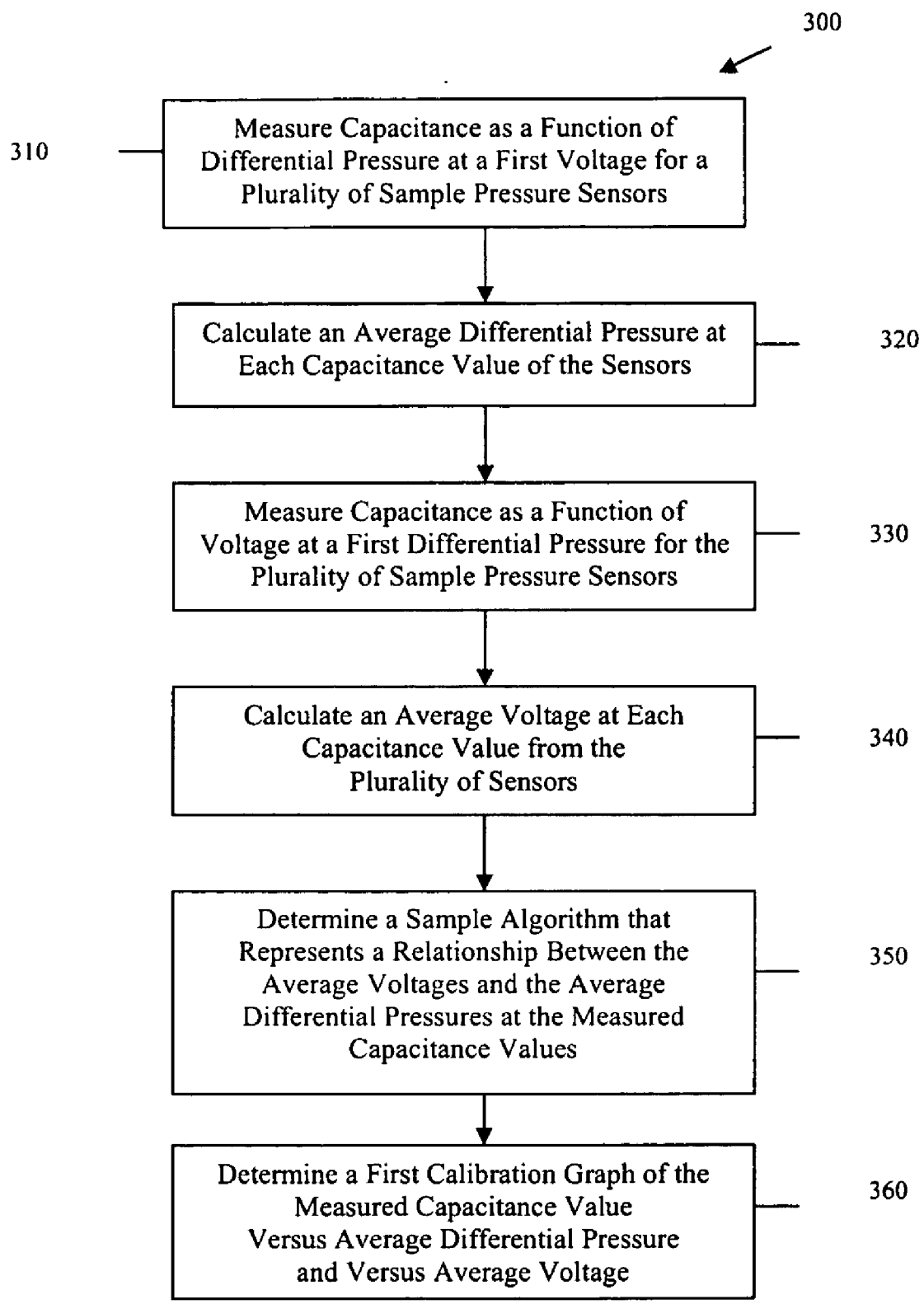
FIG. 2 illustrates an example embodiment of a process to determine a calibration mechanism for pressure sensors.

FIG. 2 illustrates an example embodiment of a process 300 to determine a calibration mechanism for the pressure sensors.

At block 310, capacitance as a function of differential pressure is measured for a plurality of sample pressure sensors. The capacitance is measured at a range of differential pressures at a first applied voltage. The first applied voltage may be a fixed value, e.g. about zero, for each of the capacitance measurements. A plurality of capacitance values are generated for the range of differential pressures applied to each of the sample pressure sensors. There may be two or more pressure sensors in the sample pressure sensors.

At block 320, an average differential pressure of the sensors is calculated at each incremental capacitance value using the differential pressures applied and the resulting measured capacitance values of the different sensors. A differential pressure curve may be determined with capacitance versus the average differential pressure as discussed with regard to block 360.

At block 330, capacitance as a function of voltage is measured for the plurality of sample pressure sensors. The capacitance is measured for a range of voltages at a differential pressure. The differential pressure may be a fixed value, e.g. about zero, for each of the capacitance measurements. The zero differential pressure may be a calibration point that is relatively easily defined, in that a defined voltage is generally easier to supply to the diaphragm to calibrate the pressure sensor than a defined pressure. A plurality of capacitance values are generated for the plurality of voltages applied for each of the sample pressure sensors. The sample pressure sensors may be the same sample pressure sensors at block 310.

The relationship between average incremental capacitance at a given voltage can also be viewed as an average voltage at a given incremental capacitance. At block 340, an average voltage of the sensors is calculated at each incremental capacitance value using the range of voltages applied and the resulting measured capacitance values of the different sensors. A graphical representation of capacitance versus the average voltage may be generated as discussed with regard to block 360.

At block 350, a sample algorithm, that represents a relationship between the determined average voltages and the determined average differential pressures at the respective capacitance values along the range of voltages and along the range of differential pressures, may be generated. In an additional embodiment, the relationship between the differential pressure and the voltage may be represented by the following formula: $P=(\mathscr{E})(V^2)/(d^2)$ where V is the voltage, d is the combined thickness of the two dielectric layers, e.g. 210 and 240, and $\mathscr{E}$ is the permittivity of the dielectric insulator. The sample algorithm may be used to generate a new calibration mechanism or graph for the pressure sensor calibrated in the field, as discussed in more detail with regard to FIG. 4.

At block 360, an equation, graph, and/or table or any other base calibration mechanism (or algorithm) may be generated with capacitance versus the average differential pressure at each capacitive value along the range of differential pressures calculated at block 320. In addition, an equation, graph, and/or table or any other base calibration mechanism may be generated of capacitance versus the average voltage along the range of voltages at each capacitive value calculated at block 340. In an embodiment, a graphical representation of this data is generated, such that a first calibration graph may include the measured capacitance value on the first axis, and the average differential pressure and the average voltage on the second axis as shown in FIG. 3, for example.

Figure 3:
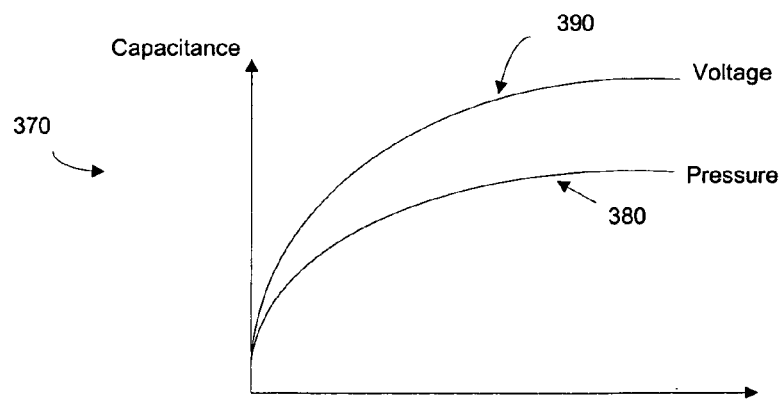
FIG. 3 illustrates an example embodiment of a schematic graphical representation of capacitance values versus voltage values and differential pressure values.

FIG. 3 illustrates an example embodiment of a schematic graphical representation 370 of capacitance values versus differential pressure 380 and voltage 390. The differential pressure curve 380 may be the graphical representation of the average differential pressure values calculated at each capacitance value along the range of differential pressures. The voltage curve 390 may be the graphical representation of the average voltage values calculated at each capacitance value along the range of voltages. The curves 380 and 390 may include at least one of extrapolating and interpolating to fill in capacitance values at a predetermined range of capacitance values at a predetermined range of increments. This graphical representation 370 may be a calibration graph used to determine unknown differential pressures applied to the pressure sensor 110, as discussed in more detail with regard to FIG. 5. The capacitance may be slightly greater than zero when the pressure differential is about zero, as represented in the graphical illustration. Thus, the pressure sensor may have negligible zero drift. The capacitance may be greater than zero when the applied voltage is about zero, as represented in the graphical illustration. The capacitance may be the same when the pressure differential is about zero and when the applied voltage is about zero, as represented in the graphical illustration.

Figure 4:
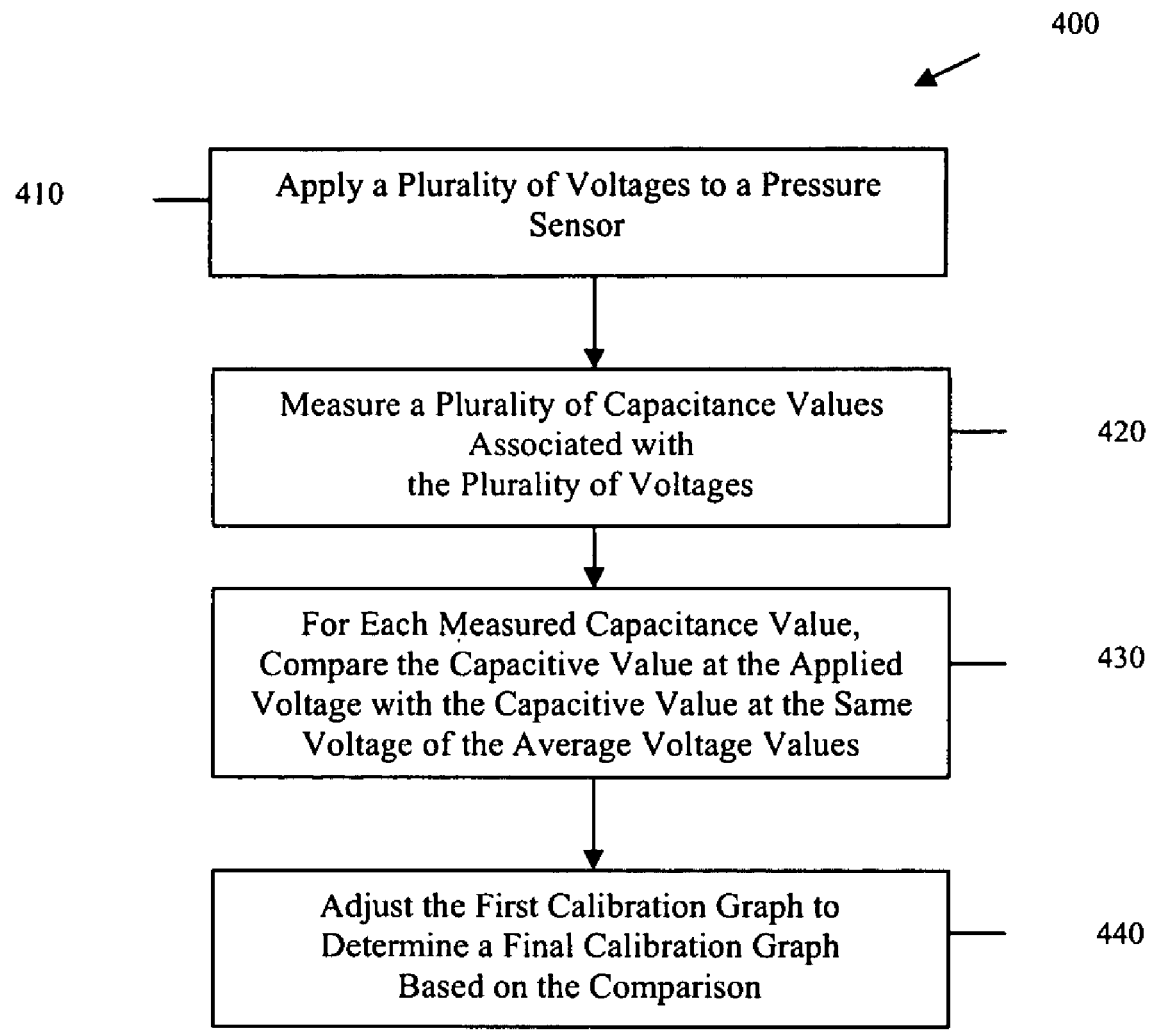
FIG. 4 illustrates an example embodiment of a process to calibrate the pressure sensor.

FIG. 4 illustrates an example embodiment of a process 400 to calibrate an individual pressure sensor 110. The pressure sensor 110 may be calibrated on the production line or in the field using the process 400.

At block 410, a plurality of voltages is applied to the pressure sensor 110. As few as two voltages, that may include a voltage value of about zero, may be applied to the pressure sensor. The plurality of voltages may be applied at a differential pressure, which may be about zero. The plurality of voltages is stored in a memory 125 of the control system 120. The diaphragm 140 may deflect as a result of the voltage applied.

At block 420, a plurality of capacitance values associated with the plurality of applied voltages of block 410 is measured. The control system stores the measured values associated with the applied voltages in the memory 125.

At block 430, for each measured capacitance value of block 420, the capacitive value at an applied voltage V may be compared with the capacitive value at the same voltage V of the average voltage values of block 340. After the comparison is made at block 430, a discrepancy or variation in the capacitance value at the voltage v may be detected. When no discrepancy is detected, the first calibration graph (the measured capacitance value vs. the average differential pressure and the average voltage) may be used as a pressure sensor calibration mechanism, e.g. the final calibration graph, in block 480, discussed with regard to FIG. 5. When a discrepancy is detected, the voltage curve 390 of the first calibration graph is adjusted at block 440.

At block 440, the first calibration graph determined at block 360 may be adjusted in response to the comparison at block 430. The first calibration graph may be adjusted to determine a pressure sensor calibration mechanism, such as a second or final calibration graph. The final calibration graph may appear similar to the graphical representation 370 illustrated at FIG. 3. The first calibration graph is adjusted such that the voltage curve 390 is moved to substantially fit and/or substantially include points on the graph that represent the plurality of measured capacitive values at block 420 associated with the plurality of applied voltages. In an embodiment, the pressure sensor calibration mechanism includes an adjustment of the base calibration algorithm using the comparison of measured capacitance values associated with the plurality of applied voltages of the base calibration algorithm and the measured capacitance values associated with the plurality of applied voltages at block 410.

The sample algorithm determined at block 350, from the sample pressure sensors, may be used to adjust the differential pressure curve 380 of the first calibration graph accordingly, assuming that the relationship between the voltage and the differential pressure remains substantially unchanged for the pressure sensor. In an additional embodiment, the relationship between the differential pressure and the voltage may be represented by $P=(\mathscr{E})(V^2)/(d^2)$. The adjusted voltage curve and the adjusted differential pressure curve, or just the adjusted pressure curve alone may form the second or final calibration graph used in FIG. 5.

Figure 5:
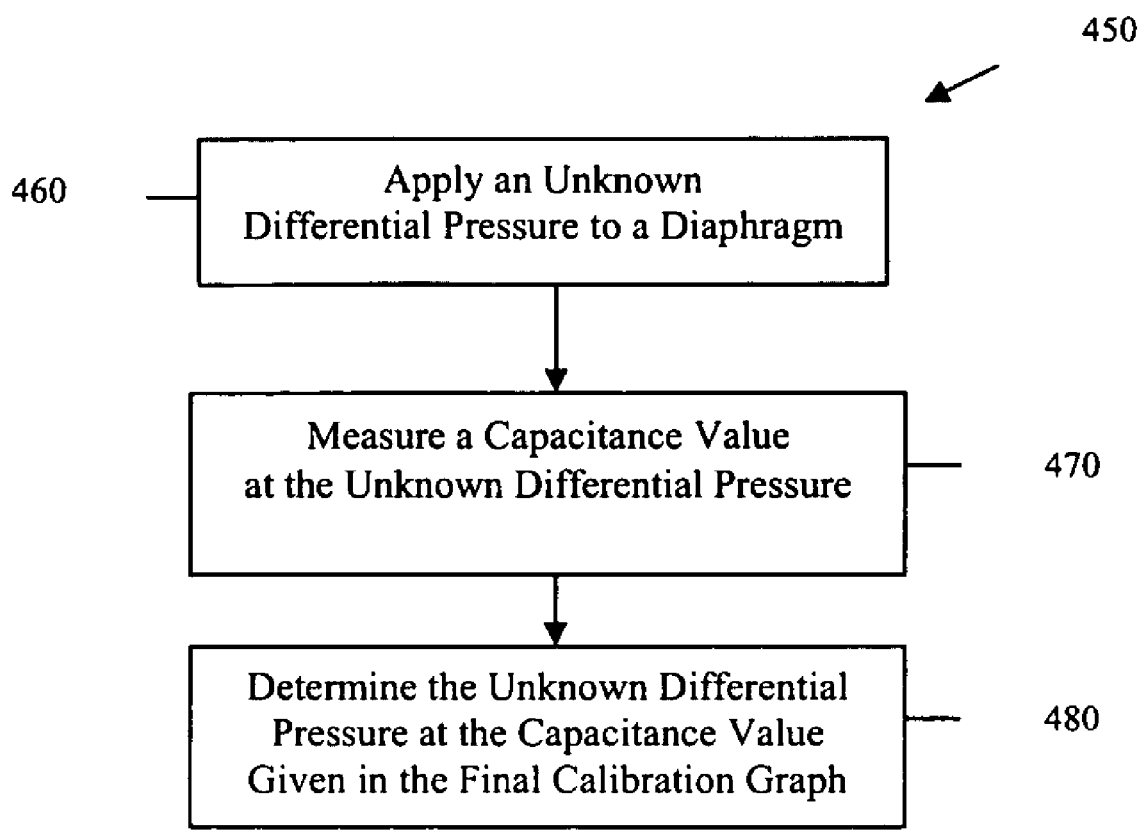
FIG. 5 illustrates an example embodiment of a process to determine an unknown differential pressure value applied to the pressure sensor using a final calibration mechanism generated in FIG. 4.

FIG. 5 illustrates an example embodiment of a process 450 to determine an unknown differential pressure value applied to individual pressure sensor 110 using the final calibration mechanism generated in FIG. 4. The calibration may be based on the voltage calibration 420 of the same sensor and on the average capacitance changes induced by pressure and voltage in blocks 310 and 330 for a plurality of similar sensors.

At block 460, an unknown differential pressure differential is applied to the diaphragm 140.

At block 470, a capacitance value, that is associated with the unknown differential pressure, is measured using the control system 120, for instance.

At block 480, the final calibration graph is used to determine the unknown differential pressure at the measured capacitance value. The differential pressure value associated with the measured capacitance value may be found in the pressure curve of the final calibration graph. The capacitance value may be looked up in the final calibration graph or calculated in any calibration algorithm, and a corresponding pressure value may be found. The control system 120 may include a processor (not shown) to calculate the unknown differential pressure using the final calibration graph, table, or equation. In an additional embodiment, the control system includes the processor and the memory 125, wherein a table or a graph of the relationship between differential pressure and capacitance is stored in the memory 125.

In an embodiment, the pressure sensor 110 includes a large signal device, such that the capacitance changes by a factor of at least two over a differential pressure range or span of the pressure sensor. For a signal device where the capacitance changes by a factor of less than 2 over the differential pressure range, the drift may dominate errors in calibration. In an embodiment, the range or span of the differential pressure in the pressure sensor is generally low. For instance, the range of differential pressure may be zero to a few pounds per square inch. This range of values may be of interest for both medical and HVAC applications.

In an embodiment, the control system 120 may be a means for dynamically calibrating the pressure sensor 110 before sensing an unknown differential pressure with the pressure sensor. The control system 120 may dynamically calibrate the pressure sensor. The control system may measure a plurality of capacitance values at a plurality of corresponding applied voltages to compare the values with a first calibration graph generated by sample pressure sensors. A final calibration graph may be generated by adjusting the first calibration graph in response to the comparison. The unknown differential pressure is applied to the diaphragm of the pressure sensor. A capacitance value is measured. Using the final calibration graph, the differential pressure at that measured capacitance value may be retrieved.

The control system 120 may include a machine-readable medium on which is stored one or more sets of instructions (e.g., software) embodying any one or more of the methodologies or functions described herein. The instructions may also reside, completely or at least partially, within the memory 125, and/or within a processor during execution thereof by the control system. The memory 125 and the processor also may constitute machine-readable media. The instructions may further be transmitted or received over a network.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 and 3, for instance, are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

Using the methods described herein, the pressure sensor may be calibrated without having a known non-zero differential pressure. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment. One skilled in the art will recognize that other configurations are available and other methods of manufacture may function as well without exceeding the scope of the disclosed subject matter.

While particular embodiments have been illustrated and described, they are merely examples and a person skilled in the art may make variations and modifications to the embodiments described herein without departing from the spirit and scope of the presently disclosed subject matter.

The invention claimed is:

1. A method to calibrate a capacitive pressure sensor comprising:
    applying a first plurality of voltages to a diaphragm of the pressure sensor at a determined differential pressure;
    measuring a plurality of capacitance values of the diaphragm at the first plurality of voltages; and
    converting the measured plurality of capacitance values to a pressure sensor calibration mechanism,
    wherein converting further includes adjusting a base calibration algorithm generated based on applying differential pressure values to sample pressure sensors.

2. The method of claim 1 wherein the determined differential pressure includes a differential pressure value of about zero.

3. The method of claim 1 wherein the first plurality of voltages includes a voltage value of about zero.

4. A method to calibrate a capacitive pressure sensor comprising:
    applying a first plurality of voltages to a diaphragm of the pressure sensor at a determined differential pressure;
    measuring a plurality of capacitance values of the diaphragm at the first plurality of voltages; and
    converting the measured plurality of capacitance values to a pressure sensor calibration mechanism, wherein converting further includes adjusting a base calibration algorithm generated based on applying a second plurality of voltages to sample pressure sensors.

5. The method of claim 4 wherein the pressure sensor calibration mechanism includes an adjustment of the base calibration algorithm based on comparison between the measured capacitance values associated with the first plurality of voltages and measured capacitance values associated with the second plurality of voltages.

6. The method of claim 4 wherein the plurality of capacitance values changes by a factor of at least two over a pressure range of the pressure sensor.

7. A system comprising:
a pressure sensor with a diaphragm; and
a control system to calibrate the pressure sensor,
wherein the control system:
  applies a plurality of voltages to a diaphragm of the pressure sensor;
  measures a plurality of first capacitance values corresponding to the plurality of applied voltages;
  compares the plurality of first capacitance values with a first calibration mechanism generated by exposing sample pressure sensors to at least one of various differential pressures and various applied voltages;
  generates a second calibration mechanism by adjusting the first calibration mechanism in response to the comparison;
  applies an unknown differential pressure to the diaphragm of the pressure sensor;
  measures a second capacitance value associated with the unknown differential pressure; and
  retrieves a differential pressure value from the second calibration mechanism at the measured second capacitance value to determine the unknown differential pressure.

8. The system of claim 7 wherein the various differential pressures are applied with an applied voltage value of about zero.

9. The system of claim 7 wherein the various voltages are applied with a differential pressure value of about zero.

10. The system of claim 7 wherein the pressure sensor includes a wireless connector to wirelessly connect to a wireless device of the control system.

11. A tangible computer-readable medium having program instructions to perform a method of calibrating a capacitive pressure sensor comprising:
  applying a first plurality of voltages to a diaphragm of the pressure sensor at a determined differential pressure;
  measuring a plurality of capacitance values of the diaphragm at the first plurality of voltages; and
  converting the measured plurality of capacitance values to a pressure sensor calibration mechanism,
  wherein converting further includes adjusting a base calibration algorithm generated based on applying differential pressure values to sample pressure sensors.

* * * * *